(12) United States Patent
Gao et al.

(10) Patent No.: US 11,709,281 B2
(45) Date of Patent: Jul. 25, 2023

(54) HIGH-PRECISION POINT POSITIONING METHOD AND DEVICE BASED ON SMARTPHONE

(71) Applicant: SOUTHEAST UNIVERSITY, Jiangsu (CN)

(72) Inventors: Chengfa Gao, Jiangsu (CN); Bo Chen, Jiangsu (CN); Yongsheng Liu, Jiangsu (CN); Puyu Sun, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 402 days.

(21) Appl. No.: 17/051,428

(22) PCT Filed: Jan. 16, 2020

(86) PCT No.: PCT/CN2020/072411
§ 371 (c)(1),
(2) Date: Oct. 28, 2020

(87) PCT Pub. No.: WO2020/233158
PCT Pub. Date: Nov. 26, 2020

(65) Prior Publication Data
US 2022/0155465 A1    May 19, 2022

(30) Foreign Application Priority Data

May 22, 2019 (CN) .......................... 201910428335.6

(51) Int. Cl.
*G01S 19/51* (2010.01)
*G01S 19/07* (2010.01)
*G01S 19/24* (2010.01)

(52) U.S. Cl.
CPC ............ *G01S 19/51* (2013.01); *G01S 19/072* (2019.08); *G01S 19/243* (2013.01)

(58) Field of Classification Search
CPC .......... G01S 19/44; G01S 19/37; G01S 19/41; G01S 19/43; G01S 19/29; G01S 19/33;
(Continued)

(56) References Cited

U.S. PATENT DOCUMENTS

2014/0002299 A1    1/2014   Leandro et al.

FOREIGN PATENT DOCUMENTS

| CN | 104597465 | 5/2015 |
| CN | 104714244 | 6/2015 |

(Continued)

OTHER PUBLICATIONS

"International Search Report (Form PCT/ISA/210) of PCT/CN2020/072411," dated Apr. 20, 2020, pp. 1-5.

*Primary Examiner* — Dung Hong
(74) *Attorney, Agent, or Firm* — JCIPRNET

(57) ABSTRACT

The present invention discloses a high-precision point positioning method and device based on a smartphone. The method of the present invention, which belongs to the technical field of satellite positioning, improves the conventional PPP uncombined positioning model, and only uses original GNSS observation values received by a smartphone to carry out high-precision positioning without GNSS reference stations. The positioning method of the present invention comprises following steps: acquiring original observation values of the smartphone, such as GNSS pseudoranges and carrier phases; after preprocessing the data to decrease part of error influences, generating an uncombined model from the original observation values according to an improved precise point positioning method based on an estimation of double clock biases; determining each satellite observation value weight according to a satellite elevation
(Continued)

angle; and carrying out filtering positioning by an improved Kalman filtering method to give a high-precision point positioning result.

8 Claims, 2 Drawing Sheets

(58) Field of Classification Search
CPC .......... G01S 19/47; G01S 19/07; G01S 19/14; G01S 19/51; G01S 19/072; G01S 19/243; H04W 64/00; H04W 4/029
See application file for complete search history.

(56) References Cited

FOREIGN PATENT DOCUMENTS

| | | | | |
|---|---|---|---|---|
| CN | 107356947 | | 11/2017 | |
| CN | 107356947 A | * | 11/2017 | ............. G01S 19/37 |
| CN | 107807373 A | * | 3/2018 | |
| CN | 108363079 A | * | 8/2018 | ............. G01S 19/27 |
| CN | 109343090 | | 2/2019 | |
| CN | 110275192 | | 9/2019 | |
| WO | WO-2011034624 A2 | * | 3/2011 | ............. G01S 19/04 |

* cited by examiner (a) Geodesic Receiver (b) Huawei P10 smartphone (a) Time Period 1

(b) Time Period 2

(c) Time Period 3

(d) Time Period 4

(e) Time Period 5

HIGH-PRECISION POINT POSITIONING METHOD AND DEVICE BASED ON SMARTPHONE

CROSS-REFERENCE TO RELATED APPLICATION

This application is a 371 of international application of PCT application serial no. PCT/CN2020/072411, filed on Jan. 16, 2020, which claims the priority benefit of China application no. 201910428335.6, filed on May 22, 2019. The entirety of each of the above mentioned patent applications is hereby incorporated by reference herein and made a part of this specification.

BACKGROUND

Technical Field

The present invention relates to a satellite positioning method for Global Navigation Satellite Systems (GNSSs), and in particular to a high-precision point positioning method and device based on original GNSS observation values of a smartphone.

Description of Related Art

Smartphones are indispensable tools in people's lives nowadays, and GNSS (Global Navigation Satellite System) modules in smartphones have greatly improved the lives of modern people. In the development of GNSS navigation and positioning technology, navigation or positioning precision has always been a key problem that restricts GNSS navigation and positioning technology from being further applied in human production and life and playing a significant role, and the same is true for GNSS navigation and positioning of smartphones. Because GNSS navigation and positioning modules in smartphones have always been encapsulated in operating systems of smartphones, researchers can only acquire final positioning results to carry out application-level development. Therefore, relative to conventional geodesic receivers, the analysis of original observation values of smartphones and the research of positioning algorithms are very scarce.

Since 2016, Google has provided an interface for accessing original GNSS observation data in the Android N operating system, and scholars have begun to evaluate the quality of GNSS data received by smartphones and analyze the positioning performance. At present, domestic and foreign scholars' researches on using original GNSS observation values to achieve high-precision positioning of smartphones are mainly divided into three directions: (1) analyzing the quality of original GNSS observation value data of a mobile end; (2) comprehensively using various types of GNSS data to increase positioning precision by a filtering method; (3) using a pseudorange or carrier difference method to increase the positioning precision of a mobile end. All these researches apply existing navigation and positioning enhancement means into smartphones, and most of research objects are Android tablets. For smartphones used by ordinary people, the current positioning performance is poor. More importantly, there is no precedent to improve conventional positioning solutions according to the nature of original observation values of smartphones at present.

SUMMARY

Objective of the invention: Based on the above background, the PPP (Precise Point Positioning) algorithm is improved to achieve the high-precision real-time point positioning of smartphones, aiming at the inconsistency between pseudorange observation values and carrier observation values of smartphones found in the test.

Technical solution: In order to achieve the aforementioned objective of the present invention, the present invention adopts the following technical solution.

A high-precision point positioning method based on a smartphone comprises the following steps:

(1) acquiring original observation values of a navigation and positioning module of the smartphone, such as GNSS pseudoranges and carrier phases;

(2) after preprocessing the data to decrease part of error influences, generating an uncombined observation value model from the original observation values according to an improved precise point positioning method based on an estimation of double clock biases;

(3) determining each satellite observation value weight according to a satellite elevation angle; and (4) carrying out calculation by employing an improved static Kalman filtering to give a high-precision point positioning result.

In a preferred embodiment, in step (1), the API based on location service provided by the operating system of the smartphone is used to directly acquire part of original GNSS data, including time data, GNSS system type and carrier phase observation values, and a pseudorange is then calculated by a signal propagation time difference according to the time data among the original GNSS data.

In a preferred embodiment, in step (2), the decrease of error influence includes using a precise ephemeris and a precise clock bias file to eliminate an orbit error and a satellite clock bias for received observation values, using an ionospheric grid file to reduce ionospheric delay and regarding a multi-path effect as observation noise, and the generated uncombined observation value model is:

$$P_i^g = \rho_i^g + c\tilde{dt}_P + d_{trop}^g + \epsilon_P^g$$

$$\Phi_i^g = \rho_i^g + c\tilde{dt}_\Phi + d_{trop}^g + \tilde{N}_i^g + \epsilon_\Phi^g$$

$$P_j^e = \rho_j^e + c\tilde{dt}_P + c\tilde{dt}_{sys}^e + d_{trop}^e + \epsilon_P^e$$

$$\Phi_j^e = \rho_j^e + c\tilde{dt}_\Phi + c\tilde{dt}_{sys}^e + d_{trop}^e + \tilde{N}_j^e + \epsilon_\Phi^e$$

$$P_k^c = \rho_k^c + c\tilde{dt}_P + c\tilde{dt}_{sys}^c + d_{trop}^c + \epsilon_P^c$$

$$\Phi_k^c = \rho_k^c + c\tilde{dt}_\Phi + c\tilde{dt}_{sys}^c + d_{trop}^c + \tilde{N}_k^c + \epsilon_\Phi^c$$

in the formula, the superscripts g, e and c respectively represent the GPS system, the Galileo system and the BDS system, the subscripts i, j and k represent ith, jth and kth satellites, P and $\Phi$ on the left are respectively pseudorange and carrier observation values, $\rho$ is the distance from a smartphone terminal to a satellite, c is light speed, $\tilde{dt}_P$ and $\tilde{dt}_\Phi$ are respectively mobile end clock biases of pseudorange and carrier observation values, $d_{trop}$ is a tropospheric delay, N is carrier integer ambiguity, and $\epsilon_P$ and $\epsilon_\Phi$ are respectively residuals of pseudorange and carrier phase observation values; and $\tilde{dt}_{sys}^e$ and $\tilde{dt}_{sys}^c$ respectively represent a time bias between the Galileo system and the GPS system and a time bias between the BDS system and the GPS system.

In a preferred embodiment, in step (3), the weight determination solution for determining the observation value weight of each satellite according to a satellite elevation angle is as follows:

when the satellite elevation angle is less than 10°, the observation value weight of the satellite is 0;

when the satellite elevation angle is greater than 10°, the observation value weight of the satellite is sin E, and E is a satellite elevation angle.

In a preferred embodiment, in step (4), improved static Kalman filtering is as follows:

for a single epoch, according to the uncombined observation value model described in step (2), the number of observation equations for a satellite is two, and if $n_1$ GPS satellites, $n_2$ Galileo satellites and $n_3$ BDS satellites are observed in a certain epoch, $n_1+n_2+n_3 \geq 8$ is met; at this point, a parameter vector to be estimated in Kalman filtering is:

$$X^T = [xyzc\tilde{dt}_P c\tilde{dt}_\Phi c\tilde{dt}_{sys}{}^e c\tilde{dt}_{sys}{}^c d_{trop} \tilde{N}_1^g \ \tilde{N}_{n_1}^g \tilde{N}_1^e \ldots \tilde{N}_{n_2}^e \tilde{N}_1^c \ldots \tilde{N}_{n_3}^c]$$

in the formula, x, y and z are positional parameters of the smartphone; then the total number of observation equations is $2 \times (n_1+n_2+n_3)$, the number of parameters to be estimated is $n_1+n_2+n_3+8$, and the number of redundant observations is $n_1+n_2+n_3-8$;

the observation equation coefficient matrix H of Kalman filtering is:

$$H = \begin{bmatrix} \alpha_1^g & \beta_1^g & \gamma_1^g & 1 & 0 & 0 & 0 & MF_1 & 0 & 0 & \ldots & 0 & 0 & \ldots & 0 & 0 \\ \alpha_1^g & \beta_1^g & \gamma_1^g & 0 & 1 & 0 & 0 & MF_1 & 0 & 1 & \ldots & 0 & 0 & \ldots & 0 & 0 \\ & & & & & & & \vdots & & & & & & & & \\ \alpha_i^e & \beta_i^e & \gamma_i^e & 1 & 0 & 1 & 0 & MF_i & 0 & 0 & \ldots & 0 & 0 & \ldots & 0 & 0 \\ \alpha_i^e & \beta_i^e & \gamma_i^e & 0 & 1 & 1 & 0 & MF_i & 0 & 0 & \ldots & 0 & 1 & \ldots & 0 & 0 \\ & & & & & & & \vdots & & & & & & & & \\ \alpha_n^c & \beta_n^c & \gamma_n^c & 1 & 0 & 0 & 1 & MF_n & 0 & 0 & \ldots & 0 & 0 & \ldots & 0 & 0 \\ \alpha_n^c & \beta_n^c & \gamma_n^c & 0 & 1 & 0 & 1 & MF_n & 0 & 0 & \ldots & 0 & 0 & \ldots & 0 & 1 \end{bmatrix}$$

In the matrix H, the row number is $2 \times (n_1+n_2+n_3)$, the column number is $n_1+n_2+n_3-8$, the subscripts 1 to n represent satellite numbers, $n=2 \times (n_1+n_2+n_3)$, and the superscripts represent GNSS system types, that is, g, e and c respectively represent the GPS system, the Galileo system and the BDS system; the odd rows correspond to pseudorange observation values, and the even rows correspond to carrier phase observation values; the first three columns α, β and γ are satellite-mobile end direction cosines, the fourth and fifth columns are clock bias coefficients of pseudorange observation values and carrier observation values, the odd rows of the fourth column are 1, and the even rows of the fifth column are 1; the sixth and seventh columns are inter-system bias coefficients; when the observation values come from the Galileo satellites, the sixth column is 1; when the observation values come from the BDS satellites, the seventh column is 1; MF is tropospheric wet delay projection coefficients; the columns after the ninth column are carrier phase ambiguity coefficients, the odd rows are 0, the even rows of the i+8th column are 1, and i is satellite number; and in the process of filtering, the weight of each satellite observation value is determined in step (3).

Based on the same inventive concept, the present invention provides a high-precision point positioning device based on a smartphone, which comprises a memory, a processor and a computer program stored in the memory and capable of running in the processor. When loaded into the processor, the computer program implements the high-precision point positioning method based on a smartphone.

Beneficial effects: Based on the conventional positioning algorithm, the high-precision point positioning method based on a smartphone proposed by the present invention optimizes the uncombined PPP observation value model according to the unique nature of original GNSS observation values of the smartphone terminal, and can achieve sub-meter level positioning precision of ordinary smartphones, and the convergence speed is fast. Based on the high-precision positioning technology of the smartphone terminal, the present invention can provide a better user experience in urban positioning, on-board navigation, tourism transportation and so on for users. In the coming era of intelligent interconnection, location service with higher precision means an unpredictable application prospect. Low-cost location service is included in the Internet of Things, automated driving, smart city and other development directions of modern people's lives, so the present invention is of great significance.

DESCRIPTION OF THE EMBODIMENTS

The technical solution of the present invention will be further described in detail below with reference to the drawings.

Figure 1:
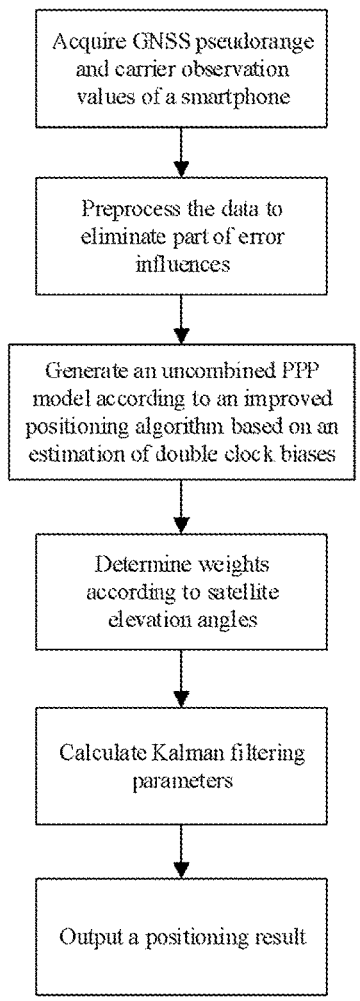
FIG. 1 is a flow chart of a high-precision point positioning method based on a smartphone.

FIG. 1 is a flow chart of a high-precision point positioning method based on a smartphone disclosed by an embodiment of the present invention. In the present embodiment, original observation values, such as original GNSS pseudorange and carrier observation values, are first acquired through the API based on location service provided by an Android system (version 7.0 and above). After the data are preprocessed to decrease part of error influences, an uncombined PPP model is generated from the original observation values according to an improved precise point positioning algorithm based on an estimation of double clock biases. Each satellite observation value weight is then determined by adopting a satellite elevation angle positioning model. Finally, an improved static Kalman filtering method is used to give a high-precision, rapidly converged real-time point positioning result. The detailed process is described below.

In the first step, original observation values, such as GNSS pseudoranges and carrier phases, are acquired through the API based on location service provided by an Android system. Part of original GNSS data, including time data, a GNSS system type, carrier phases (the first row in Table 1), a pseudorange rate and a carrier-to-noise ratio, are first directly acquired by using the GnssMeasurement class and the GnssClock class in an android.location package in Android system development. The original data contents included in the GnssMeasurement class and the GnssClock class are shown as Table 1 and Table 2.

TABLE 1

Table of Main Original GNSS Data of GnssMeasurement Class

| Original Data | Name (Unit) | Remark |
|---|---|---|
| getAccumulatedDeltaRangeMeters( ) | Accumulated carrier phase increment (m) | AccumulatedDeltaRangeMeters = -k * CarrierPhase, k = c/f, wherein c is light speed, f is carrier frequency, and CarrierPhase is carrier phase. |
| getAccumulatedDeltaRangeState( ) | Accumulated carrier phase increment state | 0: invalid or unknown state; 1: valid status; 2: reset; 4: cycle slip detected |
| getCarrierFrequencyHz( ) | Carrier frequency (Hz) | |
| getCn0DbHz( ) | Carrier-to-noise ratio (dB) | |
| getConstellationType( ) | Constellation type | 1: GPS; 2: SBAS; 3: GLONASS; 4: QZSS; 5: BDS; 6: Galileo; 9: unknown |
| getMultipathIndicator( ) | Multipath indicator | 0: unknown state; 1: multiple paths; 2: no multiple paths |
| getPseudorangeRateMetersPerSecond( ) | Pseudorange change rate (m/s) | PseudorangeRateMetersPerSecond = -k * DopplerShift, k = c/f, wherein DopplerShift is Doppler shift data. |
| getReceivedSvTimeNanos( ) | Moment when a signal transmitted by a satellite is received (ns) | That is, start timing from the current GPS week, and the value range is [0,604800]*10^9. |
| getState( ) | Satellite state | Cumulative sum of various states |
| getSvid( ) | Satellite ID | |
| getTimeOffsetNanos( ) | Local clock offset (ns) | |

TABLE 2

Table of Main Original GNSS Data of GnssClock Class

| Original Data | Name (Unit) | Remark |
|---|---|---|
| getBiasNanos( ) | Local clock bias of the smartphone (ns) | |
| getFullBiasNanos( ) | Full local clock bias of the smartphone (ns) | i.e., the difference between GPS time and the local clock of the smartphone at 00:00:00 on Jan. 6, 1980. |
| getHardwareClockDiscontinuityCount( ) | Discontinuous counting of a hardware clock | |
| getLeapSecond( ) | Leap second (s) | |
| getTimeNanos( ) | Local clock of the smartphone (ns) | |

Pseudoranges are then calculated according to the time data among the original GNSS data, the essence of which is to calculate the pseudoranges by a signal propagation time difference:

$$P=(t_{Rx}-t_{Tx}) \cdot c \quad (1)$$

Wherein P represents a pseudorange, $t_{Rx}$ represents the moment when a signal is received by the receiver, $t_{Tx}$ represents the moment when a signal transmitted by a satellite is received, and c is light speed. $t_{Tx}$ can be directly acquired by the getReceivedSvTimeNanos( ) method, and value is the number of seconds in the GPS week.

$$t_{Rx}=t_{Rx_{GNSS}}-GNSS_{week} \quad (2)$$

$$t_{Rx_{GNSS}}=\text{TimeNanos+TimeOffsetNanos}-(\text{FullBiasNanos+BiasNanos}) \quad (3)$$

wherein $t_{Rx_{GNSS}}$ represents the total number of seconds from 1980.6.1 to the current time, $GNSS_{week}$ represents the sum of all the second numbers of the whole GPS week, TimeNanos is a local clock value getTimeNanos( ) of the receiver, TimeOffsetNanos is a local clock offset getTimeOffsetNanos( ), FullBiasNanos is a full local clock bias getFullBiasNanos( ) of the receiver, and BiasNanos is a local clock bias getBiasNanos( ) of the receiver.

In the second step, after the data are preprocessed to decrease part of error influences, an uncombined observation value model is generated from the original observation values according to an improved PPP algorithm based on an estimation of double clock biases.

Figure 2:
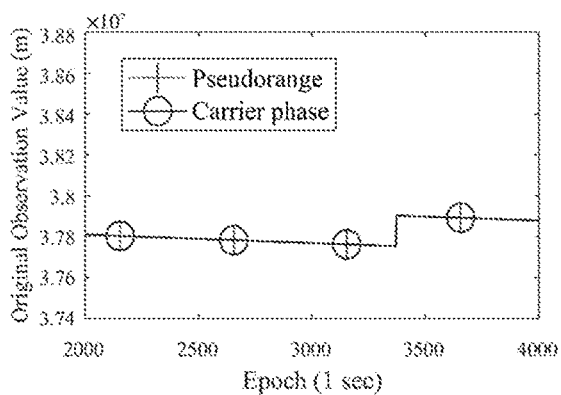
FIG. 2 is a diagram of comparison between observation values of a geodesic receiver and a smartphone observed synchronously.
Figure 2:
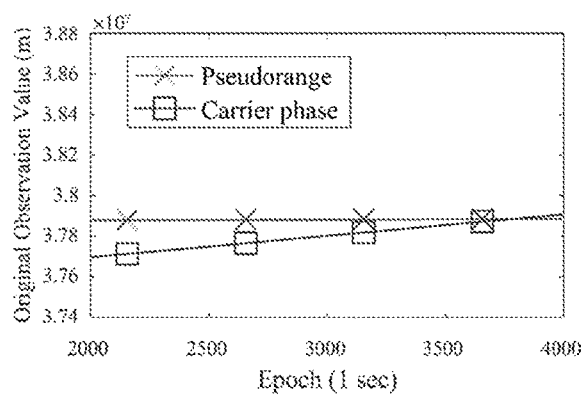

In a preliminary experiment, the smartphone and the geodesic receiver are placed at the place for synchronous observation, original observation values are collected, and the original observation value file of the smartphone is converted into a Rinex file. FIG. 2 is the comparison between the original observation values of the same geodesic receiver for satellites and the observation values of the smartphone (Huawei P10 smartphone) at the same time. In the drawing, the carrier of the receiver and the pseudorange observation values are superposed together, and in fact, the difference between the two values is equal to the integer ambiguity of the carrier phase×carrier wavelength. The observation values of the geodesic receiver will greatly jump once after a period of time, which is caused by the clock jump of the receiver but does not affect the positioning calculation of the original observation values. However, it can be obviously observed that the difference between the pseudorange and carrier phase observation values of the smartphone is not fixed, and this nature is different from that of the geodesic receiver, and affects the use of the carrier phase data of the smartphone terminal.

The different original satellite observation values of the same device are analyzed, finding that the differences between pseudorange change rates and carrier observation value change rates of different satellites at the same moment are equal, so it is considered that the pseudorange observation values and carrier observation values of the smartphone terminal have different clock biases during positioning.

According to the aforementioned nature, the positioning solution is improved to estimate two clock bias parameters during parameter calculation. Taking the GPS system as an example, the single-frequency equation is:

$$P_i^g = \rho_i^g + c d\bar{t}_P - cdT^g + d_{orb}^g + d_{trop}^g + d_{ion}^g + d_{multi/P}^g + \epsilon_P^g \quad (4)$$

$$\Phi_i^g = \rho_i^g + c d\bar{t}_\Phi - cdT^g + d_{orb}^g + d_{trop}^g + d_{ion}^g + \tilde{N}_i^g + d_{multi/\Phi}^g + \epsilon_P^g \quad (5)$$

In the formula, the superscript g represents the GPS system, the subscript i represents the ith satellites, $P_i^g$ and $\Phi_i^g$ are pseudorange and carrier observation values, $\rho_i^g$ is the distance from the smartphone terminal to a satellite, c is light speed, $d\tilde{t}_P$ and $d\tilde{t}_\Phi$ are respectively clock biases of pseudorange and carrier observation values, $dT^g$ is a satellite clock bias, $d_{trop}^g$ is a tropospheric delay, $d_{orb}^g$ is a satellite orbit error, $d_{ion}^g$ is an ionospheric delay, $d_{mult/P}^g$ and $d_{mult/\Phi}^g$ are respectively multipath effect delays of pseudoranges and carriers, $\tilde{N}_i^g$ is carrier integer ambiguity, and $\epsilon_P^g$ and $\epsilon_\Phi^g$ are respectively residuals of pseudorange and carrier phase observation values.

A predicted precise ephemeris, a clock bias file and a predicted ionospheric grid file provided by the IGS (International GNSS Service) are downloaded in real time to eliminate satellite orbit errors and clock biases and decrease ionospheric delay errors, and the influence of errors such as the relativistic effect and the rotation of the earth is corrected and eliminated by a model. After the multipath effect is regarded as observation noise, the observation value equation is simplified to give an uncombined observation value model:

$$P_i^g = \rho_i^g + c d\tilde{t}_P + d_{trop}^g + \epsilon_P^g \quad (6)$$

$$\Phi_i^g = \rho_i^g + c d\tilde{t}_\Phi + d_{trop}^g + \tilde{N}_i^g + \epsilon_\Phi^g \quad (7)$$

$$P_j^e = \rho_j^e + c d\tilde{t}_P + c d\tilde{t}_{sys}^e + d_{trop}^e + \epsilon_P^e \quad (8)$$

$$\Phi_j^e = \rho_j^e + c d\tilde{t}_\Phi + c d\tilde{t}_{sys}^e + d_{trop}^e + \tilde{N}_j^e + \epsilon_\Phi^e \quad (9)$$

$$P_k^c = \rho_k^c + c d\tilde{t}_P + c d\tilde{t}_{sys}^c + d_{trop}^c + \epsilon_P^c \quad (10)$$

$$\Phi_k^c = \rho_k^c + c d\tilde{t}_\Phi + c d\tilde{t}_{sys}^c + d_{trop}^c + \tilde{N}_k^c + \epsilon_\Phi^c \quad (11)$$

In the formula, the pseudorange and carrier observation value of each GNSS system are on the left, the superscripts e and c respectively represent the Galileo system and the BDS system, the subscripts j and k represent the jth satellite and the kth satellite, and $d\tilde{t}_{sys}^e$ and $d\tilde{t}_{sys}^c$ respectively represent a time bias between the Galileo system and the GPS system and a time bias between the BDS system and the GPS system.

In the third step, each satellite observation value weight is determined. In the method, the weight determination solution for determining the observation value weight of each satellite according to a satellite elevation angle is as follows:

$$\begin{cases} W = 0, & E < 10° \\ W = \sin E, & E \geq 10° \end{cases} \quad (12)$$

In the formula, W is a weight, and E is an elevation angle between the smartphone terminal and a satellite.

In the fourth step, Kalman filtering is employed to carry out parameter estimation to give a high-precision positioning result.

The uncombined model shown in the second step is generated for the observation values. At this point, the number of observation equations for a satellite in a single epoch is two, and if $n_1$ GPS satellites, $n_2$ Galileo satellites and $n_3$ BDS satellites are observed in a certain epoch, at this point, a parameter vector to be estimated in Kalman filtering is:

$$X^T = [xyz c d\tilde{t}_P c d\tilde{t}_\Phi c d\tilde{t}_{sys}^e c d\tilde{t}_{sys}^c d_{trop} \tilde{N}_1^g \ldots \tilde{N}_{n_1}^g \tilde{N}_1^e \ldots \tilde{N}_{n_2}^e \tilde{N}_1^c \ldots \tilde{N}_{n_3}^c] \quad (13)$$

In the formula, x, y and z are positional parameters of the smartphone.

Then the total number of observation equations is $2 \times (n_1 + n_2 + n_3)$, the number of parameters to be estimated is $n_1 + n_2 + n_3 + 8$, and the number of redundant observations is $n_1 + n_2 + n_2 - 8$.

The specific steps of Kalman filtering employed by the present invention are as follows.

(1) an initial system state value $X_0$ and a variance $P_0$ thereof are inputted. X is the parameter vector to be estimated in formula (13), and the subscript 0 represents initial moment, that is, initial values are set for the parameters to be estimated; at this point, the first three parameters are approximate coordinates (acquired by standard point positioning using pseudorange) of the smartphone, and the rest of the parameters are respectively pseudorange clock bias, carrier clock bias, inter-system bias, tropospheric wet delay and ambiguity of $n_1+n_2+n_3$ satellites, which are all set as 0.

(2) further predicted values $X_{k,k-1}$ and a variance-covariance matrix $P_{k,k-1}$ (the subscript k is the number of epochs) are calculated:

$$X_{k,k-1} = \Phi_{k,k-1} X_{k-1} \quad (14)$$

$$P_{k,k-1} = \Phi_{k,k-1} P_{k-1} \Phi_{k,k-1}^T + \Gamma_{k,k-1} Q_{k-1} \Gamma_{k,k-1}^T \quad (15)$$

In the formula, $\Phi_{k,k-1}$ is a state transition matrix (because the number of satellites may change, the nth-order $X_{k-1}$ of the previous epoch needs to be changed into the mth-order $X_k$ of this epoch). $\Gamma_{k,k-1}$ is a system noise driving matrix, $Q_{k-1}$ is a positive definite matrix of system errors (errors of the model), input is required for each epoch, and $_{k,k-1} Q_{k-1\ k,k-1}$ can be directly regarded as a whole, defined as a mth-order symmetric matrix. It is the same as $P_0$ during initial positioning. During positioning in subsequent epochs, the true values of three positional parameters and n ambiguity parameters should not be changed, so process noise is 0 (variance corresponding to system noise). Random models for smartphone clock bias, inter-system bias and tropospheric delay parameters are simulated by using random walk process models.

(3) a gain matrix $K_k$ is calculated:

$$K_k = P_{k,k-1} H_k^T (H_k P_{k,k-1} H_k^T + R_k)^{-1} \quad (16)$$

In the formula, $H_k$ is a coefficient matrix for observation equations. For conventional static Kalman filtering, $H_k$ in the method needs to be modified accordingly:

$$H_k = \begin{bmatrix} \alpha_1^g & \beta_1^g & \gamma_1^g & 1 & 0 & 0 & 0 & MF_1 & 0 & \ldots & 0 & \ldots & 0 \\ \alpha_1^g & \beta_1^g & \gamma_1^g & 0 & 1 & 0 & 0 & MF_1 & 1 & \ldots & 0 & \ldots & 0 \\ & & & & & \vdots & & & & & & & \\ \alpha_i^e & \beta_i^e & \gamma_i^e & 1 & 0 & 1 & 0 & MF_i & 0 & \ldots & 0 & \ldots & 0 \\ \alpha_i^e & \beta_i^e & \gamma_i^e & 0 & 1 & 1 & 0 & MF_i & 0 & \ldots & 1 & \ldots & 0 \\ & & & & & \vdots & & & & & & & \\ \alpha_n^c & \beta_n^c & \gamma_n^c & 1 & 0 & 0 & 1 & MF_n & 0 & \ldots & 0 & \ldots & 0 \\ \alpha_n^c & \beta_n^c & \gamma_n^c & 0 & 1 & 0 & 1 & MF_n & 0 & \ldots & 0 & \ldots & 1 \end{bmatrix} \quad (17)$$

The row number of $H_k$ is $2 \times (n_1+n_2+n_3)$, the column number is $n_1+n_2+n_2+8$, and in the formula, $n=2 \times (n_1+n_2+n_3)$; the subscripts represent satellite numbers, and the superscripts represent GNSS system types; the odd rows correspond to pseudorange observation values, and the even rows correspond to carrier phase observation values; the first three columns $\alpha$, $\beta$ and $\gamma$ are satellite-mobile end direction cosines, and the calculation formula is shown as formula (18); the fourth and fifth columns are clock bias coefficients of pseudorange observation values and carrier observation values, the odd rows of the fourth column are 1, and the even rows of the fifth column are 1; the sixth and seventh columns are inter-system bias coefficients; when the observation values come from the Galileo satellites, the sixth column is 1; when the observation values come from the BDS satellites, the seventh column is 1; and in the eighth column, MF is tropospheric wet delay projection coefficients (the tropospheric dry delay is corrected by a Hopfield model, and the projection function is a Niell model). The ninth column to the $n_1+n_2+n_2+8$th column are carrier phase ambiguity coefficients, the 2×ith row of the i+8th column is 1, and i is satellite number.

$$\begin{cases} \alpha = -\dfrac{x^s - x_0}{\rho_0} \\ \beta = -\dfrac{y^s - y_0}{\rho_0} \\ \gamma = -\dfrac{z^s - z_0}{\rho_0} \end{cases} \quad (18)$$

In the formula, $x^s$, $y^s$ and $z^s$ are satellite coordinates (acquired through an ephemeris file), $x_0$, $y_0$ and $z_0$ are approximate coordinates (acquired by standard point positioning using pseudorange) of the smartphone, and $\rho_0$ is an approximate distance (calculated through satellite coordinates and approximate smartphone coordinates) from the smartphone terminal to a satellite.

In formula (16), $R_k$ is an observation noise variance matrix:

$$R_k = \begin{bmatrix} \left(\dfrac{\sigma_P}{W_1}\right)^2 & 0 & & & & \\ 0 & \left(\dfrac{\sigma_\Phi}{W_1}\right)^2 & & & & 0 \\ \vdots & & \ddots & & \vdots & \\ & & & \left(\dfrac{\sigma_P}{W_n}\right)^2 & 0 & \\ 0 & & \cdots & 0 & \left(\dfrac{\sigma_\Phi}{W_n}\right)^2 \end{bmatrix} \quad (19)$$

In the formula, $\sigma_P$ and $\sigma_\Phi$ are respectively zenithal standard deviations of pseudorange observation values and carrier observation values, and W is a weight of each satellite, i.e., each satellite observation value weight calculated by formula (12). In the process of Kalman filtering, the setting of variances of observation values is very important, and improper setting can easily cause filtering divergence, severely affecting the positioning result. In the present invention, the zenithal standard deviations of observation values are determined according to the quality of the original GNSS observation value data of the smartphone detected in the previous experiment. The zenithal standard deviations of pseudorange observation values and carrier phase observation values of the Xiaomi 8 smartphone used in the example are respectively set as 3.0 m and 0.2 m.

(4) the estimated filtering parameter value vector $X_k$ of the current epoch and a corresponding variance-covariance matrix $P_k$ are calculated:

$$X_k = X_{k,k-1} + K_k(L_k - H_k X_{k,k-1}) \quad (20)$$

$$P_k = (I - K_k H_k) P_{k,k-1} (I - K_k H_k)^T + K_k R_k K_k^T \quad (21)$$

In the formula, $L_k$ is an observation value vector, i.e., the pseudorange and carrier observation values of each GNSS system in formulas (6) to (11), and I is a unit matrix.

After calculation is completed, the first three items in the $X_k$ vector are accurate coordinates of the smartphone calculated in the current epoch. If the current epoch is not the last epoch, then return to step (2) to carry out circular filtering calculation until a multi-epoch filtering solution is obtained in the end.

Experimental Example

The time of the experiment was 2018.10.19, a Xiaomi 8 smartphone was used, and the test site was the GE01 control point in the campus of the Southeast University. Observations were carried out five times, about 6 minutes each time, and the sampling interval was 1 s. The accurate coordinates of the observation station had been obtained in advance by means of network RTK.

Figure 3:
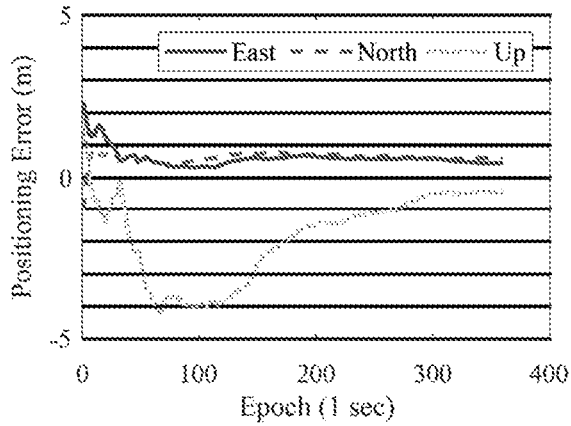
FIG. 3 is a diagram of positioning results of examples of the present invention.
Figure 3:
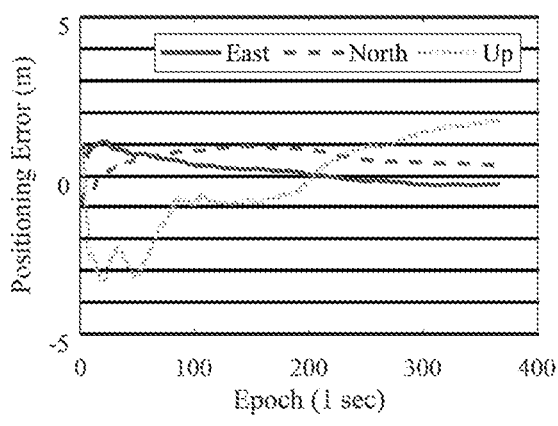
Figure 3:
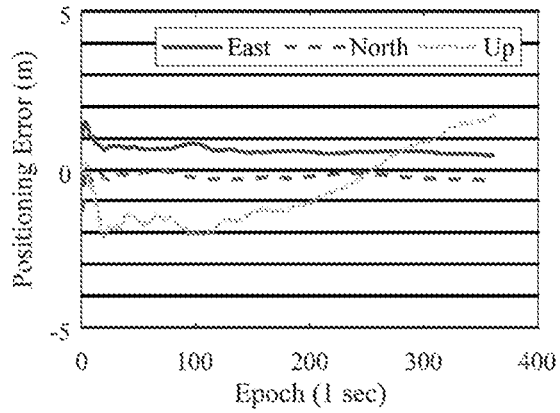
Figure 3:
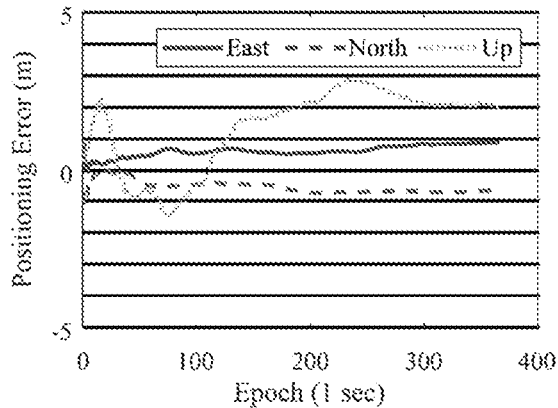
Figure 3:
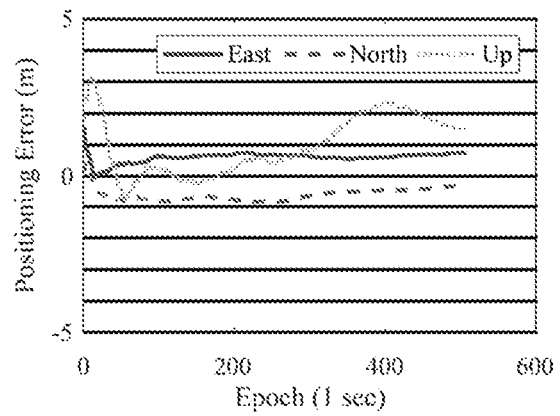

The method of the present invention was employed to carry out a positioning test on the Xiaomi 8 smartphone. The result is shown as FIG. 3. After a period of time of observation, all the errors of data in five time periods in N and E directions could be converged to be less than 1 m.

Errors of positioning in the five time periods were counted, as shown in Table 3. The average error in plane was 0.81 m, while the average error in elevation was 1.65 m. This result is better than the highest positioning precision that can be achieved currently by using ordinary smartphones.

TABLE 3

Error of Positioning in Each Time period In The Example

| | Root Mean Square Error (m) | | | | |
|---|---|---|---|---|---|
| Time Period | E | N | U | Plane | Three Dimensions |
| 1 | 0.64 | 0.62 | 2.24 | 0.89 | 2.41 |
| 2 | 0.42 | 0.64 | 1.47 | 0.76 | 1.66 |
| 3 | 0.63 | 0.25 | 1.33 | 0.68 | 1.49 |
| 4 | 0.63 | 0.58 | 1.86 | 0.85 | 2.05 |
| 5 | 0.61 | 0.64 | 1.35 | 0.88 | 1.61 |
| Average | 0.59 | 0.54 | 1.65 | 0.81 | 1.84 |

The convergence time is defined as the time from the moment when positioning is started to the moment when the errors of positioning in both N and E directions are less than 1 m and the errors in subsequent epochs no longer exceed 1 m. The convergence times in the five time periods are shown as table 4. Convergence can be achieved within 30 s in each time period, indicating that the method can be applied to real-time positioning and provide a low-delay high-precision smartphone positioning result.

TABLE 4

Convergence Time in Each Time Period In The Example

| Time Period | Convergence Time (s) |
|---|---|
| 1 | 26 |
| 2 | 25 |
| 3 | 11 |
| 4 | 2 |
| 5 | 3 |

Based on the same inventive concept, an example of the present invention discloses a high-precision point positioning device based on a smartphone, which comprises a memory, a processor and a computer program stored in the memory and capable of running in the processor. When loaded into the processor, the computer program implements the high-precision point positioning method based on a smartphone. A test result indicates that by using the positioning method proposed by the present invention, a positioning precision higher than 0.9 m in plane and 1.7 m in elevation can be achieved for the smartphone.

What is claimed is:

1. A high-precision point positioning method based on a smartphone, wherein the high-precision point positioning method based on a smartphone comprises the following steps:
   (1) acquiring original observation values of a navigation and positioning module of the smartphone, such as Global Navigation Satellite System (GNSS) pseudoranges and carrier phases;
   (2) after preprocessing the data to decrease part of error influences, generating an uncombined observation value model from the original observation values according to an improved precise point positioning method based on an estimation of double clock biases;
   (3) determining each satellite observation value weight according to a satellite elevation angle; and
   (4) carrying out calculation by employing an improved static Kalman filtering to give a high-precision point positioning result;
   wherein in the step (1), the API based on location service provided by the operating system of the smartphone is used to directly acquire part of original GNSS data, comprising time data, GNSS system type and carrier phase observation values, and a pseudorange is then calculated by a signal propagation time difference according to the time data among the original GNSS data.

2. The high-precision point positioning method based on a smartphone according to claim 1, wherein in step (2), the decrease of error influence comprises using a precise ephemeris and a precise clock bias file to eliminate an orbit error and a satellite clock bias for received observation values, using an ionospheric grid file to reduce ionospheric delay and regarding a multi-path effect as observation noise, and the generated uncombined observation value model is:

$$P_i^g = \rho_i^g + c\tilde{dt}_P + d_{trop}^g + \epsilon_P^g$$

$$\Phi_i^g = \rho_i^g + c\tilde{dt}_\Phi + d_{trop}^g + \tilde{N}_i^g + \epsilon_\Phi^g$$

$$P_j^e = \rho_j^e + c\tilde{dt}_P + c\tilde{dt}_{sys}^e + d_{trop}^e + \epsilon_P^e$$

$$\Phi_j^e = \rho_j^e + c\tilde{dt}_\Phi + c\tilde{dt}_{sys}^e + d_{trop}^e + \tilde{N}_j^e + \epsilon_\Phi^e$$

$$P_k^c = \rho_k^c + c\tilde{dt}_P + c\tilde{dt}_{sys}^c + d_{trop}^c + \epsilon_P^c$$

$$\Phi_k^c = \rho_k^c + c\tilde{dt}_\Phi + c\tilde{dt}_{sys}^c + d_{trop}^c + \tilde{N}_k^c + \epsilon_\Phi^c$$

in the formula, the superscripts g, e and c respectively represent the GPS system, the Galileo system and the BDS system, the subscripts i, j and k represent ith, jth and kth satellites, P and $\Phi$ on the left are respectively pseudorange and carrier observation values, $\rho$ is the distance from a smartphone terminal to a satellite, c is light speed, $\tilde{dt}_P$ and $\tilde{dt}_\Phi$ are respectively mobile end clock biases of pseudorange and carrier observation values, $d_{trop}$ is a tropospheric delay, $\tilde{N}$ is carrier integer ambiguity, and $\epsilon_P$ and $\epsilon_\Phi$ are respectively residuals of pseudorange and carrier phase observation values; and $\tilde{dt}_{sys}^e$ and $\tilde{dt}_{sys}^c$ respectively represent a time bias between the Galileo system and the GPS system and a time bias between the BDS system and the GPS system.

3. A high-precision point positioning device based on a smartphone, comprising a memory, a processor and a computer program stored in the memory and capable of running in the processor, wherein when loaded into the processor, the computer program implements the high-precision point positioning method based on a smartphone according to claim 2.

4. The high-precision point positioning method based on a smartphone according to claim 1, wherein in step (3), the weight determination solution for determining the observation value weight of each satellite according to a satellite elevation angle is as follows:
   when the satellite elevation angle is less than 10°, the observation value weight of the satellite is 0;
   when the satellite elevation angle is greater than 10°, the observation value weight of the satellite is sin E, and E is a satellite elevation angle.

5. A high-precision point positioning device based on a smartphone, comprising a memory, a processor and a computer program stored in the memory and capable of running in the processor, wherein when loaded into the processor, the computer program implements the high-precision point positioning method based on a smartphone according to claim 4.

6. The high-precision point positioning method based on a smartphone according to claim 1, wherein in step (4), the improved static Kalman filtering is as follows:
   for a single epoch, according to the uncombined observation value model described in step (2), the number of observation equations for a satellite is two, and if $n_1$ GPS satellites, $n_2$ Galileo satellites and $n_3$ BDS satellites are observed in a certain epoch, $n_1+n_2+n_3 \geq 8$ is met; at this point, a parameter vector to be estimated in Kalman filtering is:

$$X^T = [xyzc\tilde{dt}_P c\tilde{dt}_\Phi, c\tilde{dt}_{sys}^e c\tilde{dt}_{sys}^c d_{trop} \tilde{N}_1^g \ldots \tilde{N}_{n_1}^g \tilde{N}_1^e \ldots \tilde{N}_{n_2}^e \tilde{N}_1^c \ldots \tilde{N}_{n_3}^c]$$

in the formula, x, y and z are positional parameters of the smartphone; then the total number of observation equations is $2 \times (n_1+n_2+n_3)$, the number of parameters to be estimated is $n_1+n_2+n_3+8$, and the number of redundant observations is $n_1+n_2+n_3-8$;
the observation equation coefficient matrix H of Kalman filtering is:

$$H = \begin{bmatrix} \alpha_1^g & \beta_1^g & \gamma_1^g & 1 & 0 & 0 & 0 & MF_1 & 0 & 0 & \ldots & 0 & 0 & \ldots & 0 & 0 \\ \alpha_1^g & \beta_1^g & \gamma_1^g & 0 & 1 & 0 & 0 & MF_1 & 0 & 1 & \ldots & 0 & 0 & \ldots & 0 & 0 \\ & & & & & & & \vdots & & & & & & & & \\ \alpha_i^e & \beta_i^e & \gamma_i^e & 1 & 0 & 1 & 0 & MF_i & 0 & 0 & \ldots & 0 & 0 & \ldots & 0 & 0 \\ \alpha_i^e & \beta_i^e & \gamma_i^e & 0 & 1 & 1 & 0 & MF_i & 0 & 0 & \ldots & 0 & 1 & \ldots & 0 & 0 \\ & & & & & & & \vdots & & & & & & & & \\ \alpha_n^c & \beta_n^c & \gamma_n^c & 1 & 0 & 0 & 1 & MF_n & 0 & 0 & \ldots & 0 & 0 & \ldots & 0 & 0 \\ \alpha_n^c & \beta_n^c & \gamma_n^c & 0 & 1 & 0 & 1 & MF_n & 0 & 0 & \ldots & 0 & 0 & \ldots & 0 & 1 \end{bmatrix}$$

in the matrix H, the row number is $2 \times (n_1+n_2+n_3)$, the column number is $n_1+n_2+n_3-8$, the subscripts 1 to n represent satellite numbers, $n=2 \times (n_1+n_2+n_3)$, and the superscripts represent GNSS system types, that is, g, e and c respectively represent the GPS system, the Galileo system and the BDS system; the odd rows correspond to pseudorange observation values, and the even rows correspond to carrier phase observation values; the first three columns α, β and γ are satellite-mobile end direction cosines, the fourth and fifth columns are clock bias coefficients of pseudorange observation values and carrier observation values, the odd rows of the fourth column are 1, and the even rows of the fifth column are 1; the sixth and seventh columns are inter-system bias coefficients; when the observation values come from the Galileo satellites, the sixth column is 1; when the observation values come from the BDS satellites, the seventh column is 1; MF is tropospheric wet delay projection coefficients; the columns after the ninth column are carrier phase ambiguity coefficients, the odd rows are 0, the even rows of the i+8th column are 1, and i is satellite number; and in the process of filtering, the weight of each satellite observation value is determined in step (3).

7. A high-precision point positioning device based on a smartphone, comprising a memory, a processor and a computer program stored in the memory and capable of running in the processor, wherein when loaded into the processor, the computer program implements the high-precision point positioning method based on a smartphone according to claim 6.

8. A high-precision point positioning device based on a smartphone, comprising a memory, a processor and a computer program stored in the memory and capable of running in the processor, wherein when loaded into the processor, the computer program implements the high-precision point positioning method based on a smartphone according to claim 1.

* * * * *